United States Patent [19]
Hollingshead et al.

[11] Patent Number: 5,566,510
[45] Date of Patent: Oct. 22, 1996

[54] MOLDED GLASS RUN CHANNEL CORNER ASSEMBLY

[75] Inventors: Chris J. Hollingshead, Wabash; Eric E. Gardner, Hartford City, both of Ind.

[73] Assignee: GenCorp Inc., Fairlawn, Ohio

[21] Appl. No.: 329,605

[22] Filed: Oct. 26, 1994

[51] Int. Cl.$^6$ ........................................ E06B 7/16
[52] U.S. Cl. ........................................ 49/479.1; 49/475.1
[58] Field of Search ........................... 49/479.1, 475.1, 49/440, 441; 502

[56] References Cited

U.S. PATENT DOCUMENTS

| | | | |
|---|---|---|---|
| 1,979,691 | 11/1934 | Jackson | 154/43 |
| 4,649,668 | 3/1987 | Skillen et al. | 49/374 |
| 4,653,230 | 3/1987 | Seo et al. | 49/502 |
| 4,656,784 | 4/1987 | Brachmann | 49/491 |
| 4,783,931 | 11/1988 | Kirkwood | 49/441 |
| 4,800,681 | 1/1989 | Skillen et al. | 49/440 |
| 4,809,463 | 3/1989 | Schroder et al. | 49/377 |
| 4,817,336 | 4/1989 | Kisanuki | 49/479.1 |
| 4,884,723 | 12/1989 | Dugge | 222/542 |
| 4,888,917 | 12/1989 | Mesnel et al. | 49/479.1 |
| 4,908,989 | 3/1990 | Omura et al. | 49/441 |
| 4,910,918 | 3/1990 | Naples | 49/479.1 |
| 4,913,976 | 4/1990 | Brooks et al. | 428/494 |
| 4,923,759 | 5/1990 | Brooks et al. | 428/521 |
| 4,951,418 | 8/1990 | Keys | 49/440 |
| 4,956,941 | 9/1990 | Vaughan | 49/440 |
| 4,970,102 | 11/1990 | Guillon | 49/498 |
| 5,013,379 | 5/1991 | Brooks et al. | 156/244.11 |
| 5,014,464 | 5/1991 | Dupuy et al. | 49/491 |
| 5,038,521 | 8/1991 | Andrzejewski | 49/441 |
| 5,083,832 | 1/1992 | Ohya | 49/502 |
| 5,095,656 | 3/1992 | Keys | 49/441 |
| 5,317,835 | 6/1994 | Dupuy et al. | 49/441 |

*Primary Examiner*—Brian K. Green
*Assistant Examiner*—Curtis A. Cohen
*Attorney, Agent, or Firm*—Robert F. Rywalski; Larry R. Meenan

[57] ABSTRACT

A molded glass run channel corner assembly formed by molding an extruded rigid division post and a flexible extruded header such that the corner assembly is capable of providing a continuous seal with contiguous corner edges of glass windows positioned on each side of the division post and a method of manufacture.

15 Claims, 7 Drawing Sheets

MOLDED GLASS RUN CHANNEL CORNER ASSEMBLY

FIELD OF THE INVENTION

The present invention relates to a molded glass run channel corner assembly. More particularly, the present invention relates to a glass run channel corner assembly formed by molding an extruded rigid division post and a flexible extruded header such that the corner assembly is capable of providing a continuous seal with contiguous corner edges of glass windows positioned on each side of the division post and a method of manufacture.

BACKGROUND OF THE INVENTION

A glass run channel is a channel shaped molding installed in an upper frame of a vehicle, such as an automobile for preventing infiltration of air and moisture and the like and guiding or containing a moveable or fixed glass window. The upper frame of the vehicle typically includes a header, belt line portion, a division post, a B-pillar, also known as a center pillar on a four door vehicle, and a C-pillar. The division post, B-pillar and C-pillar extend between the belt line and the header. The division post, C-pillar, and belt line portion form a subframe within the upper frame typically for retaining the fixed glass window. The header, B-pillar and division post and belt line capture horizontally spaced and vertically disposed glass run channels to restrict the vertical movement of the window and assist in maintaining the glass window in the proper orientation during vertical movement. The vertical leg of the glass run channel is known as a division post glass run channel and the horizontal leg of the glass run channel is known as the header glass run channel. The glass run channel as described herein generally does not extend below the belt line.

Heretofore, the construction and styling of the glass run channel assembly for the moveable glass window in the rear upper frame and the fixed glass window in the subframe has been relatively expensive and particularly cumbersome to accomplish given the numerous components comprising the assembly.

For example, one method of manufacturing a glass run channel assembly for sealing both the moveable glass window and the fixed glass window is by notching the horizontal leg of the glass run channel and inserting an end of the vertical leg of the glass run channel within the notched portion and then refilling the notched portion with a suitable material to completely bond the sealing surfaces of the glass run channels together. It will be appreciated that in this process, approximately three fourths of the horizontal leg of the channel is removed such that none of the sealing lips as more fully described below remain to provide a continuous seal with the moveable glass window and the fixed glass window. In addition, during installation of the fixed glass window within the glass run channel assembly the sealing surfaces often break apart because of the difficulty of assembly.

In yet another method of manufacturing a glass run channel assembly, the fixed glass window is purchased as part of a preassembled unit. The unit includes the fixed glass window surrounded by a plastic molding and a U-shaped metal section into which the glass run channel is adapted. The unit is then affixed by a threaded fastener into the bottom of the door frame and into a top door frame flange. The horizontal leg of the glass run channel contains a bulb and a primary sealing lip. The horizontal leg of the glass run channel does not contain secondary sealing lip. It will be appreciated that the preassembled unit is attached to the door frame by threaded fasteners which create holes in the assembly thereby allowing moisture and wind to penetrate the glass run channel assembly.

To alleviate the aforementioned problems we have invented a novel glass run channel assembly wherein the corner that is formed between the extruded division post glass run channel and extruded header glass run channel is molded such that the glass run channel assembly maintains a continuous seal on the moveable glass window edge and the fixed glass window edge. In addition, it is a feature of the present invention that the molded assembly corner includes a continuous inboard and outboard sealing lip that allows for slight variations of the sheet metal sealing surface while maintaining an acceptable fit and flush appearance. It is a further feature of the present invention that the glass run channel corner assembly presents an aesthetically pleasing appearance with no molding lines between the outboard header glass run channel and the outboard division post glass run channel. Yet another feature of the present invention is to provide a molded glass run channel assembly corner assembly that allows for rougher handling during installation, simplified manufacture, and reduced cost of manufacture due to reduced material scrap. Still another feature of the present invention is to provide a molded corner formed of a division post glass run channel and a header glass run channel which receives a moveable window and a fixed window such that when the windows are positioned against the glass run channel corner assembly a seal is provided against the intrusion of water, dirt, wind and noise.

SUMMARY OF THE INVENTION

Briefly, according to this invention there is provided a glass run channel corner assembly formed by molding an extruded rigid division post glass run channel and an extruded flexible header glass run channel. The division post glass run channel includes an H-shaped cross sectional member having an outboard sealing lip and an opposing inboard sealing lip joined together a selected distance by a cross-piece which functions as a divider to define opposing glass run channels. The header glass run channel includes an inboard sealing lip, outboard sealing lip, inside reveal sealing lip, and a bulb, wherein an inwardly facing edge of the outboard sealing lip. An outwardly facing edge of the inboard sealing lip and the bulb cooperatively form a C-shaped channel and the inside reveal sealing lip and the inboard sealing lip cooperatively form a C-shaped channel to receive a metal flange of an upper door frame. The corner assembly includes a curved inboard sealing lip which bonds with and joins the inboard sealing lip of the header glass run channel and the inboard sealing lip of the division post glass run channel, and an inboard presentation surface which bonds with and joins the inboard presentation surface of the division post glass run channel and the inside reveal sealing lip of the header glass run channel, wherein the outboard sealing lip of the division post glass run channel is independent of the outboard sealing lip of the header glass run channel.

The process of forming the glass run channel corner assembly according to the present invention involves inserting the division post glass run channel and the header glass run channel within a mold assembly; supporting the outboard sealing lip of the header glass run channel a selected distance from the outboard sealing lip of the division post glass run channel within the mold assembly; and injecting an elastomeric material within the mold assembly to form a glass run channel corner assembly having a curved inboard sealing lip which bonds with and joins the inboard sealing lip of the header glass run channel and the inboard sealing lip of the division post glass run channel and forms an inboard presentation surface which bonds with and joins the inboard presentation surface of the division post glass run channel and the inside reveal sealing lip of the header glass run channel such that the outboard sealing lip of the division post glass run channel is independent of the outboard sealing lip of the header glass run channel.

BRIEF DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Referring to the drawings wherein like reference characters represent like elements, FIGS. 1–5 illustrate a division post glass run channel 10 and header glass run channel 12 installed in an upper frame 14 and subframe 16 of a rear of a vehicle such as an automobile. The upper frame 14 of the vehicle includes a header 18, belt line portion 20, a division post 22, a B-pillar 24, also known as a center pillar on a four door vehicle, and a C-pillar 26. The division post 22, B-pillar 24 and C-pillar 26 extend between the belt line portion 20 and the header 18. The division post 22, C-pillar 26 and belt line portion 20 form the subframe 16 within the upper frame 14 typically for retaining a fixed glass window 30. The header 18, B-pillar 24 and division post 22 and belt line portion 20 capture horizontally spaced and vertically disposed glass run channels 10 and 12 to restrict the vertical movement of a glass window 28 and assist in maintaining the glass window in the proper orientation during vertical movement. The header 18, belt line portion 20, division post 22 and C-pillar 26 of the upper frame 14 are formed of fabricated metal which may be stamped or rolled and then welded where necessary to form the frames as well known in the art.

In accordance with the present invention, the division post glass run channel 10 and the header glass run channel 12 are operatively joined by a molding operation to form a glass run channel corner assembly 32 to form a seal to prevent moisture, air and the like from penetrating around a glass window when the glass window is positioned against the glass run channel corner assembly.

The division post glass run channel 10 is formed of an extruded elastomeric material employing extrusion techniques and conditions well known in the art. The elastomeric material may be a thermoplastic elastomer having a durometer of Shore A from about 60 to about 90 to provide a generally rigid property. In a preferred embodiment, the elastomeric material is an ethylene propylene diene monomer rubber material (EPDM). To increase the rigidity of lower Shore A durometer material a metal reinforcement strip 34 such as a steel strip or a composite having an outer material surface durometer of Shore A of approximately 70 covering an inner material durometer of Shore A of approximately 90 may be extruded within the elastomeric material forming the division post glass run channel 10 as well known in the art.

The division post glass run channel 10 is extruded as an H-shaped cross sectional member. The H-shaped cross sectional member includes an outboard sealing lip 36 and an opposing inboard sealing lip 38. The outboard sealing lip 36 and the inboard sealing lip 38 are positioned on the periphery of opposing sides of the moveable glass window 28 and the fixed glass window 30 and are joined together a selected distance by a cross-piece 40 which functions as a divider to define opposing glass run channels to receive the moveable glass and the fixed glass, respectively.

The outboard sealing lip 36 and the inboard sealing lip 38 of the glass-run channel 10 include distal finger-like projections 42 which readily separate when the glass window 28 is inserted therebetween and at the same time are sufficiently resilient to cooperatively embrace the glass window to effect a seal and to help hold the glass window in position. As well known in the art, the exterior surfaces of the finger-like projections 42 may include flocking, polyethylene, a silicone type surface or the like to reduce abrasion and wear of the glass run channel 10. The outboard sealing lip 36 and the inboard sealing lip 38 of the glass run channel 10 preferably have an exterior presentation surface 44 and interior presentation surface 46, to present an aesthetically pleasing appearance. The outboard sealing lip 36 of the division post glass run channel 10 is preferably comprised of a flexible material, i.e., such as a thermoplastic elastomer having a durometer of Shore A from about 60 to about 80, preferably about 65 to about 75.

The division post glass run channel 10 is secured to the door frame by most any suitable means such as a sheet metal formed bracket, an adhesive, or one or more screws fastened through the inboard sealing lip 38 or a suitable combination thereof.

The header glass run channel 12 of the glass run channel corner assembly 32 is also formed of an extruded elastomeric material using extrusion techniques well known in the art. Suitable elastomeric materials for the header glass run channel 12 include thermoplastic elastomers, EPDM rubber and the like having a durometer of Shore A from about 60 to about 90 to allow for a wide tolerance as to the glass window size and fit and the door sizes and fit in the vehicle.

The header glass run channel may also be formed of a composite having an outer material surface durometer of Shore A of approximately 70 covering an inner material durometer of Shore A of approximately 90.

The header glass run channel 12 includes an inboard sealing lip 48, outboard sealing lip 50, inside reveal sealing lip 52, and a bulb 54. The bulb 54 protrudes outwardly toward the glass edge and may be solid or porous (e.g., sponge-like), and is sufficiently resilient to hold its general protruding bulbous shape and yet is sufficiently flexible to slightly collapse internally while tightly and slidably engaging the glass. An inwardly facing edge 56 of the outboard sealing lip 50, an outwardly facing edge 58 of the inboard sealing lip 48 and the bulb 54 cooperatively form a C-shaped channel which contacts and seals the top edge and the inwardly and outwardly facing surfaces of the moveable glass 28 when the glass is positioned therein. Similarly, the inside reveal sealing lip 52 and the inboard sealing lip 48 cooperatively form a C-shaped channel to receive a metal flange 60 of the upper door frame 14. The metal flange 60 of the upper door frame 14 is retained within the C-shaped channel through a series of finger-like projections 62 which extend inwardly from the inboard sealing lip 48 and inside reveal sealing lip 52.

As known in the art, the glass contacting surfaces of the header glass run channel 12 may include a low friction surface which may be comprised of any suitable material such as a flocking, polypropylene wear strip or silicone type surface and the like.

Referring to FIGS. 6–11, the process of manufacturing the glass run channel corner 32 from a division post glass run channel 10 and a header glass run channel 12 in accordance with the present invention is shown. Briefly, the method includes the steps of inserting the division post glass run channel and the header glass run channel within a mold assembly in a predetermined arrangement. The outboard sealing lip of the header glass run channel is then supported a selected distance from the outboard sealing lip of the division post glass run channel within the mold assembly. Next, an elastomeric material is injected within the mold assembly to form a glass run channel corner assembly having a curved inboard sealing lip which bonds with and joins the inboard sealing lip of the header glass run channel and the inboard sealing lip of the division post glass run channel and forms an inboard presentation surface which bonds with and joins the inboard presentation surface of the division post glass run channel and the inside reveal sealing lip of the header glass run channel such that the outboard sealing lip of the division post glass run channel is independent of the outboard sealing lip of the header glass run channel.

Figure 1:
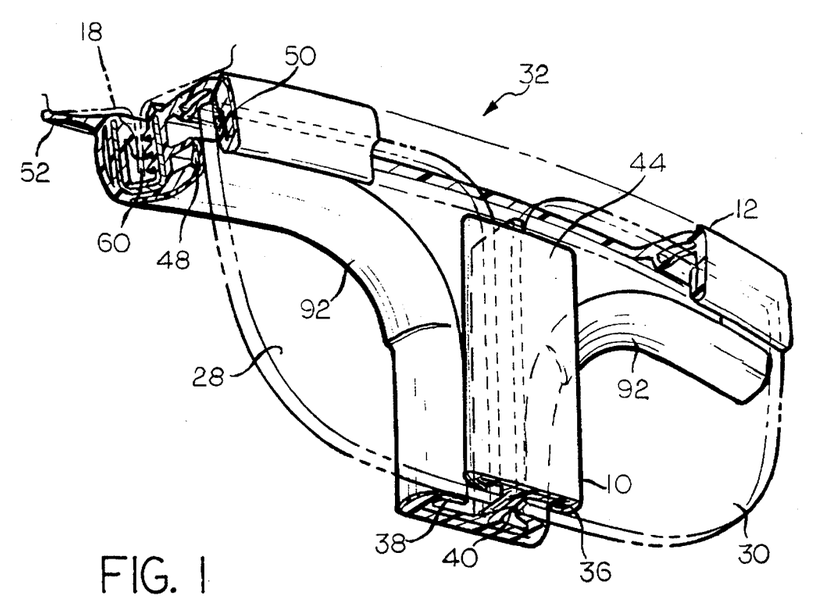
FIG. 1 is a partial perspective view of a corner formed of a rigid extruded division post glass run channel and a flexible extruded header glass run channel.
Figure 2:
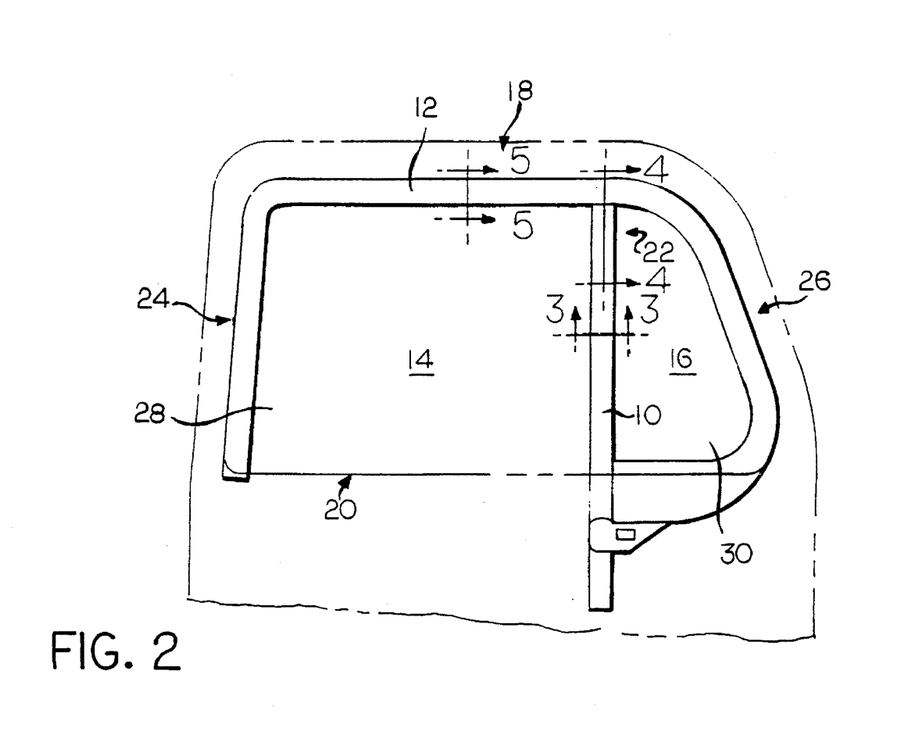
FIG. 2 is an elevational view of an upper frame of an automotive left rear door incorporating a glass run channel in accordance with the present invention.
Figures 3, 4:
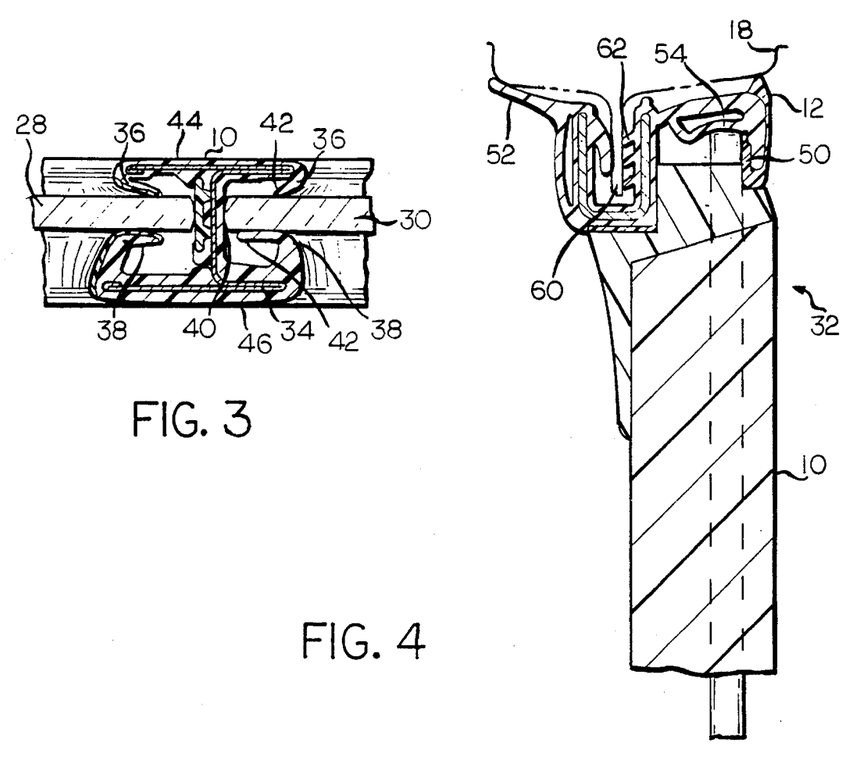
FIG. 3 is a cross-sectional view taken along line 3—3 of FIG. 2.
FIG. 4 is a cross-sectional view taken along line 4—4 of FIG. 2.
Figure 5:
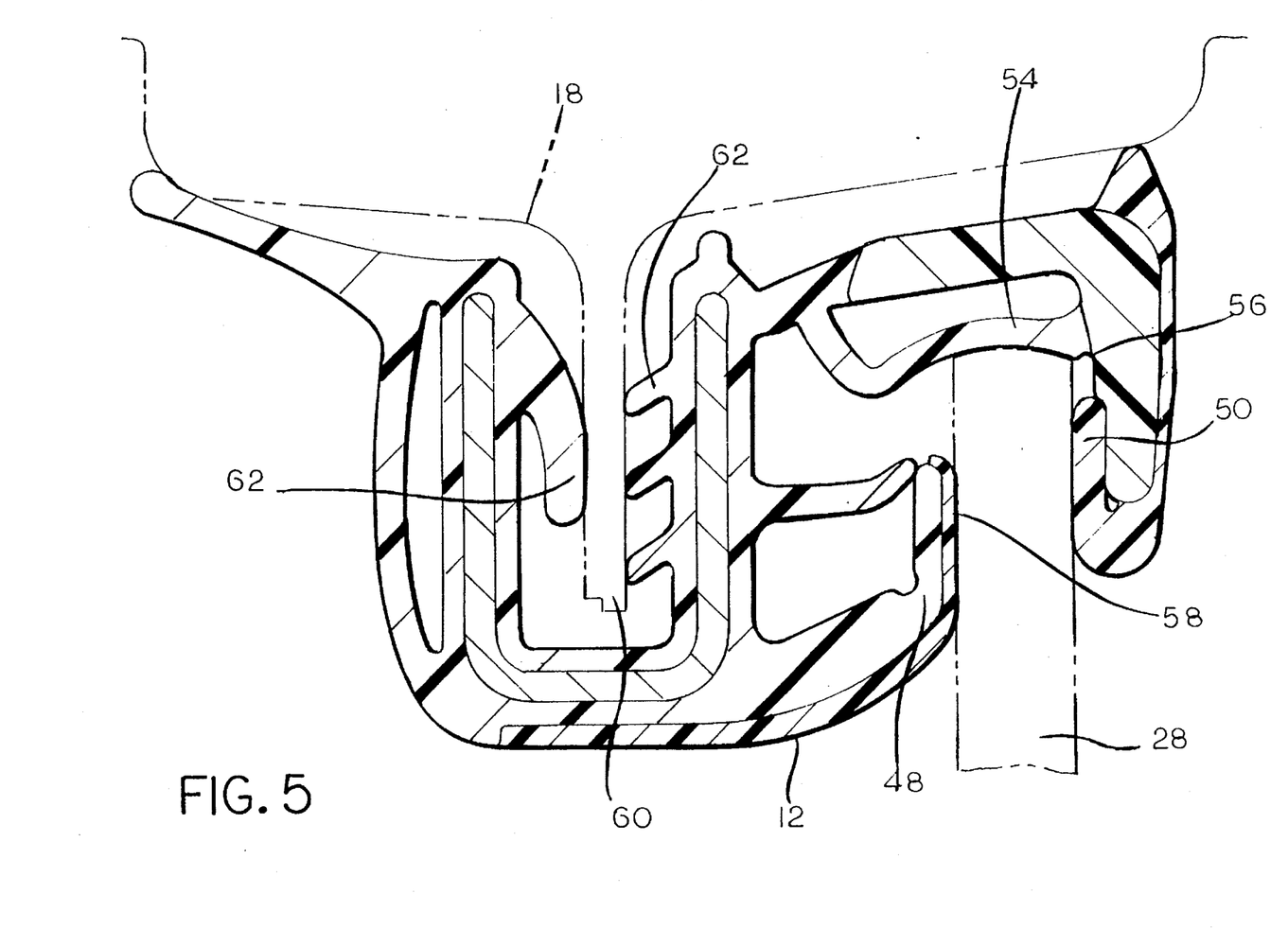
FIG. 5 is a cross-sectional view taken along line 5—5 of FIG. 2.
Figure 6:
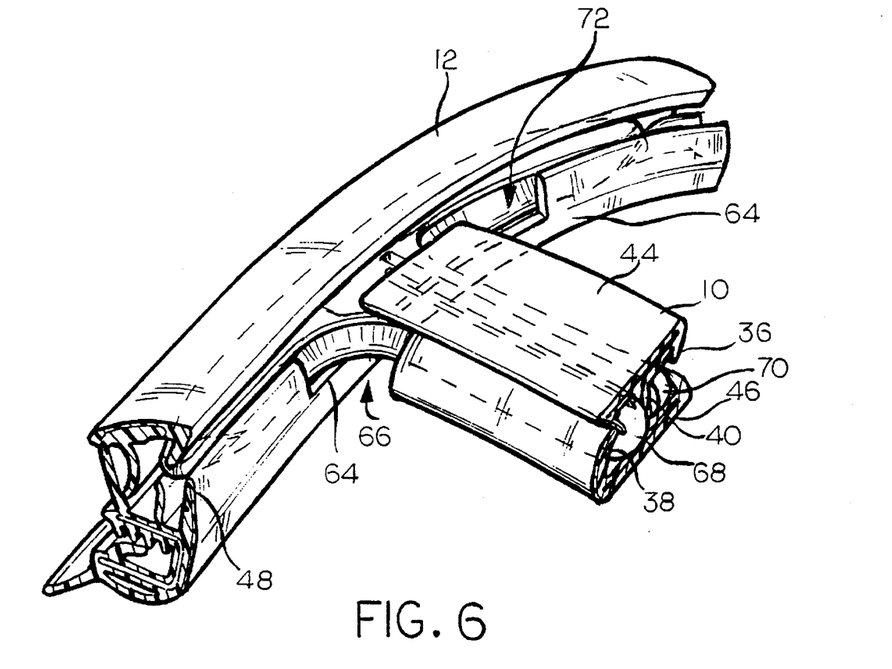
FIG. 6 is a partial perspective view of the extruded division post glass run channel and the flexible extruded header glass run channel prior to molding.
Figure 7:
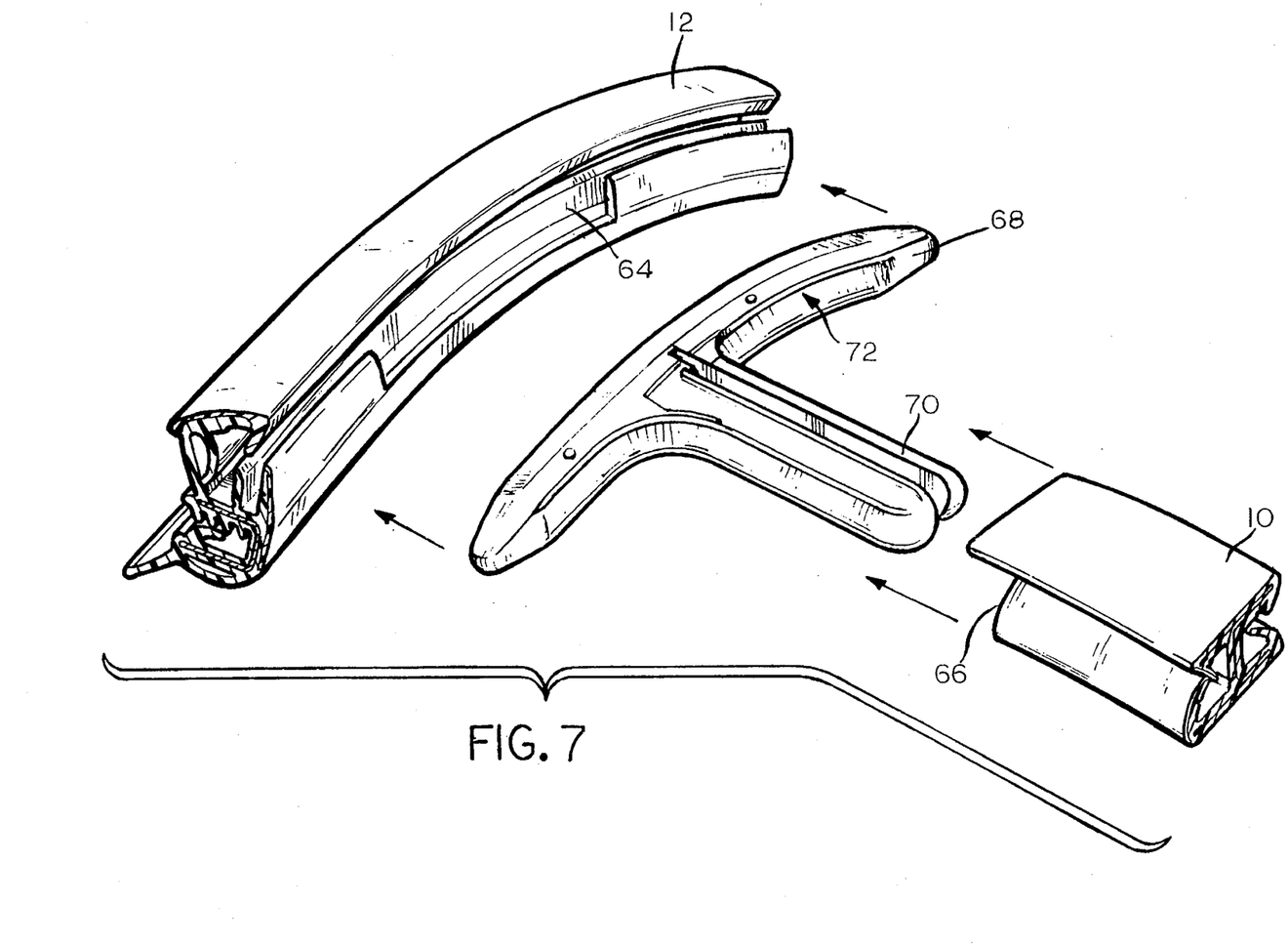
FIG. 7 is an exploded view of the extruded division post glass run channel and the flexible extruded header glass run channel prior to molding.

In one embodiment, the process of manufacturing the glass run channel corner 32 from a division post glass run channel 10 and a header glass run channel 12 includes forming a notch 64 in the header glass run channel 12. The notch 64 is formed by removing a portion of the inboard sealing lip 48 to allow the outward surface of the outboard sealing lip 36 of the division post glass run channel 10 to be positioned flush with the outward surface of the outboard sealing lip 50 of the header glass run channel 12. Similarly, a notch 66 is also formed in the inboard sealing lip of the division post glass run channel 10 by removing a portion of the inboard sealing lip 38. The inboard sealing lip 48 of the header glass run channel 12 and the inboard sealing lip 38 of the division post glass run channel 10 are notched so that when combined they can be refilled with elastomeric material and/or bonded to both inboard sealing lips on both the top and the bottom ends of the H-shaped rigid cross section. After the glass run channels 10 and 12 are appropriately notched, a T-shaped insert 68 having a bifurcated lower leg 70 and a transverse crossbar 72 may be inserted between the division post glass run channel 10 and the header glass run channel 12 to fix the glass run channels in a generally perpendicular arrangement.

Referring to FIGS. 6 and 7, the bifurcated lower leg 70 of the T-shaped insert 68 is inserted within the channel 10 and the crossbar 72 is inserted through the notched portion of the glass run channel within the header glass run channel 12. The T-shaped insert 68 may be formed of most any suitable nonbrittle, hard metal such as a steel alloy and the like which may withstand the high temperatures of molding an elastomeric material such as EPDM rubber and the like. The header glass run channel 12 and the division post glass run channel 10 are arranged in a desired orientation by the T-shaped insert 68.

Figure 8:
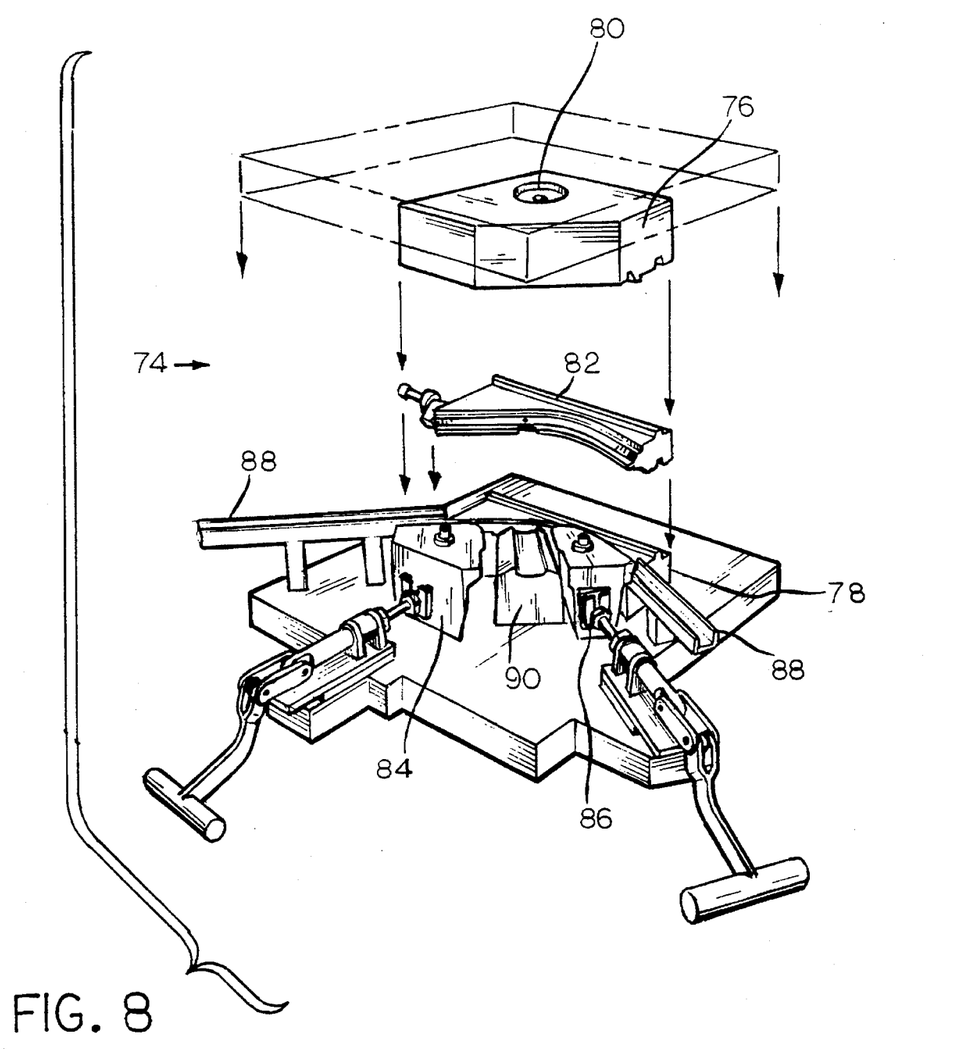
FIG. 8 is an exploded view of the mold apparatus for manufacturing the corner of FIG. 1.
Figure 9:
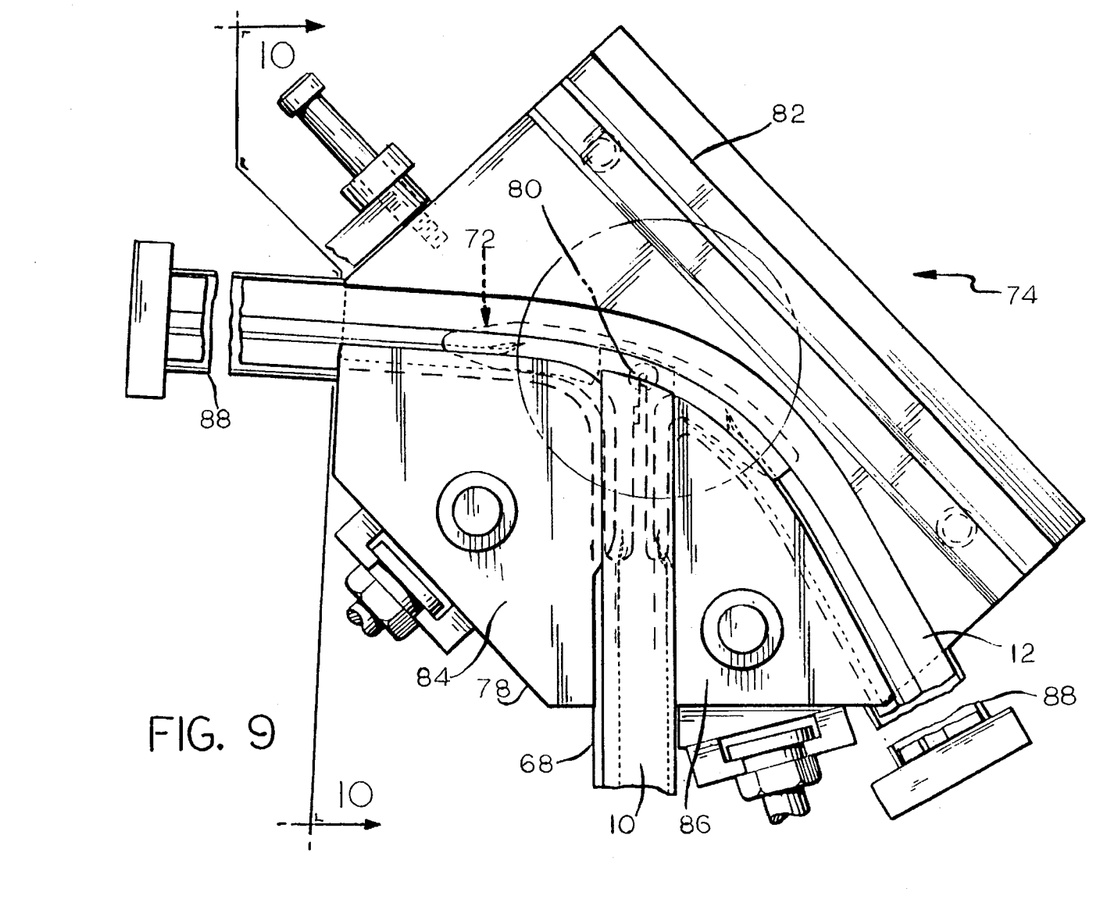
FIG. 9 is a top view of the mold apparatus of FIG. 8.
Figure 10:
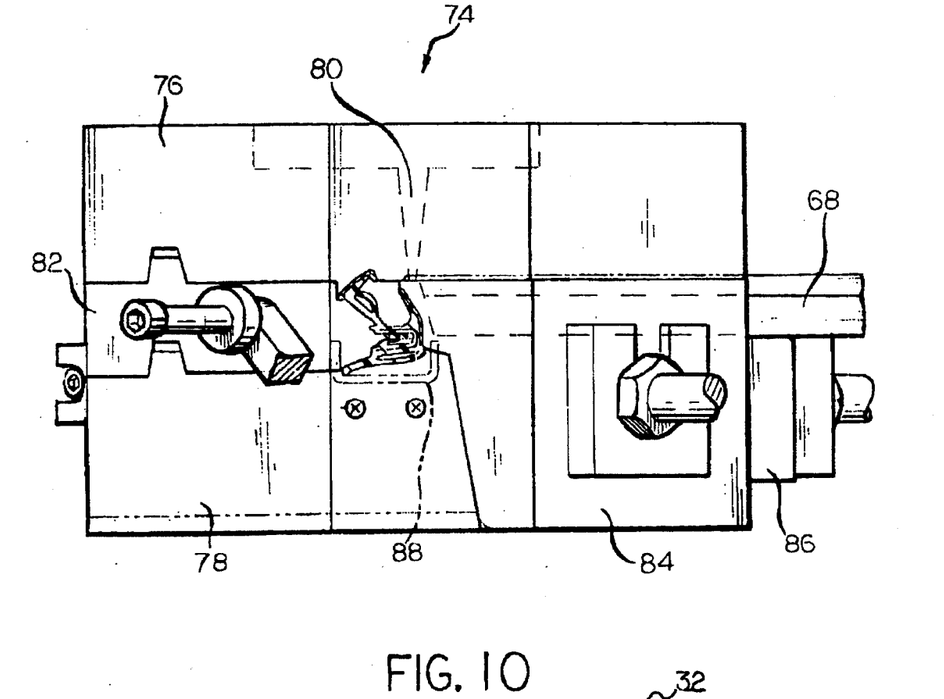
FIG. 10 is a side view of the mold apparatus of FIG. 8.
Figure 11:
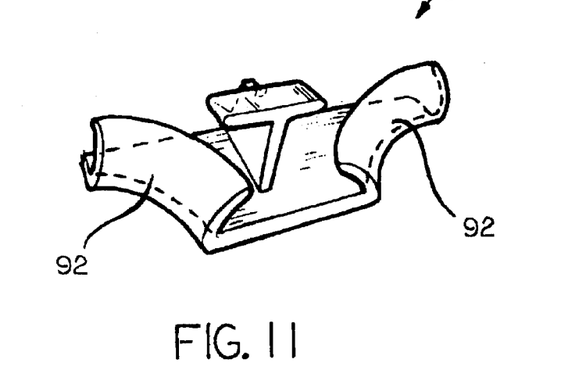
FIG. 11 is a perspective view of the molded corner joining the rigid extruded division post glass run channel and the flexible extruded header glass run channel.

The mold assembly 74 as shown in FIGS. 8–10 includes a top mold 76 and a complimentary configured bottom mold 78. The top mold 76 and the bottom mold 78 when combined form a cavity of a size and shape which corresponds with the exterior profile of the corner of the finished combined header glass run channel 12 and the division post glass run channel 10 as shown in FIGS. 1–4.

The top mold 76 of the mold assembly 74 includes a sprue 80 through which elastomeric material is injected into the mold cavity and a hinge plate 82 which supports the back of the glass run channel cavity. The bottom mold 78 of the mold assembly 74 includes two sliders 84 and 86 which are operable to support and shape the cavity formed at the juncture of the header glass run channel 12 and the division post glass run channel 10. The sliders 84 and 86 are operable between a retracted position wherein the cavity is open and the glass run channel corner 32 to be molded may be introduced or removed as desired and an extended position wherein the cavity is closed and fully formed. In addition, in the extended position the sliders 84 and 86 operatively prop the outboard sealing lip of the header glass run channel 12 a selected distance from the outboard sealing lip of the division post glass run channel 10 within the mold assembly 74. As shown in FIG. 8, the sliders 84 and 86 are independently manually activated between the extended position and the retracted position as desired.

The bottom mold 78 of the mold assembly 74 further includes a means for positioning the header glass run channel 12 and the division post glass run channel 10 in a selected position within the mold assembly. The positioning means includes a part support 88 formed of a channel member shaped and sized to hold the header glass run channel 12 and a part support 90 shaped and sized to hold the division post glass run channel 10.

The glass run channel corner 32 is molded by lifting the hinge plate 82 and placing the header glass run channel 12 within the hinge plate. The hinge plate 82 is positioned against the inside reveal sealing lip 52 of the header glass run channel 12. The hinge plate is then lowered on to the bottom mold such that the header glass run channel rests on the part support 88. The bifurcated lower leg 70 of the T-shaped insert 68 is inserted within the division post glass run channel 10 and placed on the part support 90. The crossbar 72 of the T-shaped insert 68 is then inserted through the notched portion of the glass run channel within the header glass run channel 12. Next, the sliders 84 and 86 are closed against the inner sides of the corner formed by the juncture of the header glass run channel 12 and the division post glass run channel 10 to form the inner sides of the glass run channel corner assembly 32 and to prop the outboard sealing lip of the header glass run channel 12 a selected distance from the outboard sealing lip of the division post glass run channel 10 within the mold assembly 74. It will be appreciated that because the outboard sealing lip 36 is propped or supported away from the outboard sealing lip 50 such that during molding the outboard sealing lips do not bond together the flexibility of the header glass run channel is retained allowing the glass run channel to adapt to slight variations of the vehicle sheet metal sealing surface while maintaining an acceptable fit and flush appearance. The top mold 76 is then placed on the bottom mold 78 thereby surrounding the top and bottom surface of the juncture of the header glass run channel 12 and the division post glass run channel 10.

Elastomeric material is then injected through a sprue 80 or opening in the top surface of the top mold 76 into the cavity such that elastomeric material covers the portion of the T-shaped insert 68 which is exposed between the header glass run channel 12 and the division post glass run channel 10 within the mold assembly 74. A representative illustration of the shape of the elastomeric material injected into the cavity is provided in FIG. 11. The injected elastomeric material forms a glass run channel corner assembly 32 having a curved inboard sealing lip 92 which bonds with and joins the inboard sealing lip 48 of the header glass run channel 12 and the inboard sealing lip 38 of the division post glass run channel 10 and forms an inboard presentation surface 94 which bonds with and joins the inboard presentation surface of the division post glass run channel 10 and the inside reveal sealing lip 52 of the header glass run channel 12. In addition, the outboard sealing lip 36 of the division post glass run channel 10 remains "opened up" or independent of the outboard sealing lip 50 of the header glass run channel 12 as previously described such that the fixed glass window may be easily inserted within the glass run channel by simply flexing the outboard sealing lip 50 apart from the outboard sealing lip 36 without concern for breakage of a bond between the outboard sealing lips 36 and 50 as previously experienced. The glass run channel assembly may then be fitted within the vehicle frame as well known in the art as an integral member.

The foregoing construction has the advantage of permitting the division post glass run channel 12 to form two separate complete glass run channels about the fixed glass window 30 and the moveable glass window 28. Moreover, it will be appreciated that the "opened up" design as described herein provides the additional advantageous features of a continuous inboard and outboard sealing lip which allows for slight variations of the sheet metal sealing surface while maintaining an acceptable fit and flush appearance, allows for rougher handling during installation resulting in fewer splits, simplified manufacture requiring reduced handling and complex assembly, reduced manufacturing cost due to less scrap because the corner is manufactured from a reduced number of members, and an aesthetically pleasing appearance with no molding lines between the outboard header glass run channel and the outboard division post glass run channel.

Having described presently preferred embodiments of the invention it will be appreciated that the invention may be otherwise embodied within the scope of the appended claims.

What is claimed is:

1. A glass run channel assembly formed by molding, the glass run channel assembly comprising a division post glass run channel and a header glass run channel, the division post glass run channel including an H-shaped cross sectional member having outboard sealing lips including distal finger-like projections and opposing inboard sealing lips including distal finger-like projections, the outboard sealing lips and the inboard sealing lips joined together a selected distance by a cross-piece which functions as a divider to define opposing glass run channels, the outboard sealing lips of the division post glass run channel having therebetween an outboard presentation surface and the inboard sealing lips of the division post glass run channel having therebetween an inboard presentation surface, the header glass run channel including an inboard sealing lip, outboard sealing lip, inside reveal sealing lip, and a bulb, wherein an inwardly facing edge of the outboard sealing lip, an outwardly facing edge of the inboard sealing lip and the bulb cooperatively form a C-shaped channel and the inside reveal sealing lip and the inboard sealing lip cooperatively form a C-shaped channel to receive a metal flange of an upper door frame, and a corner assembly including:

a) a curved inboard sealing lip which bonds with and joins the inboard sealing lip of the header glass run channel and the inboard sealing lips of the division post glass run channel; and b) an inboard presentation surface which bonds with and joins the inboard presentation surface of the division post glass run channel and the inside reveal sealing lip of the header glass run channel, wherein the outboard sealing lips of the division post glass run channel have free edges unconnected to the outboard sealing lip of the header glass run channel.

2. The glass run channel assembly of claim 1 wherein the finger-like projections include exterior surfaces having an abrasion and wear resistant surface.

3. The glass run channel assembly of claim 2 wherein the outboard sealing lips of the division post glass run channel are made of a rigid material.

4. The glass run channel assembly of claim 2 wherein the division post glass run channel is made of a thermoplastic elastomer having a durometer of Shore A from about 60 to about 90.

5. The glass run channel assembly of claim 2 wherein the division post glass run channel is made of ethylene propylene diene monomer rubber material.

6. The glass run channel assembly of claim 5 wherein the division post glass run channel includes a steel strip within the elastomeric material.

7. The glass run channel assembly of claim 5 wherein the header glass run channel is made of a thermoplastic elastomer having a durometer of Shore A from about 60 to about 90.

8. The glass run channel assembly of claim 5 wherein the header glass run channel is made of ethylene propylene diene monomer rubber material.

9. The glass run channel assembly of claim 5 wherein the header glass run channel is formed as a composite having an outer material durometer of Shore A of approximately 70 covering an inner material durometer of Shore A of approximately 90.

10. A glass run channel assembly comprising:

a) a rigid division post glass run channel including an H-shaped cross sectional member having outboard sealing lips and opposing inboard sealing lips joined together a selected distance by a cross-piece which functions as a divider to define opposing glass run channels, the outboard sealing lips of the division post glass run channel having therebetween an outboard presentation surface and the inboard sealing lips of the division post glass run channels having therebetween an inboard presentation surface;

b) an extruded flexible a header glass run channel including an inboard sealing lip, outboard sealing lip, inside reveal sealing lip, and a bulb, wherein an inwardly facing edge of the outboard sealing lip, an outwardly facing edge of the inboard sealing lip and the bulb cooperatively form a C-shaped channel and the inside reveal sealing lip and the inboard sealing lip cooperatively form a C-shaped channel to receive a metal flange of an upper door frame; and c) a glass run channel corner assembly including a curved inboard sealing lip which bonds with and joins the inboard sealing lip of the header glass run channel and the inboard sealing lips of the division post glass run channel, and an inboard presentation surface which bonds with and joins the inboard presentation surface of the division post glass run channel and the inside reveal sealing lip of the header glass run channel, wherein the outboard sealing lips of the division post glass run channel have a free edge unconnected to the outboard sealing lip of the header glass run channel.

11. The glass run channel assembly of claim 10 wherein the division post glass run channel is made of a thermoplastic elastomer having a durometer of Shore A from about 60 to about 90.

12. The glass run channel assembly of claim 10 wherein the division post glass run channel is made of ethylene propylene diene monomer rubber material.

13. The glass run channel assembly of claim 10 wherein the header glass run channel is made of a thermoplastic elastomer having a durometer of Shore A from about 60 to about 90.

14. The glass run channel assembly of claim 10 wherein the header glass run channel is made of ethylene propylene diene monomer rubber material.

15. The glass run channel assembly of claim 10 wherein the header glass run channel is formed as a composite having an outer material durometer of Shore A of approximately 70 covering an inner material durometer of Shore A of approximately 90.

* * * * *